US010130976B2

(12) United States Patent
    Xin et al.

(10) Patent No.: US 10,130,976 B2
(45) Date of Patent: Nov. 20, 2018

(54) WIPING SYSTEM

(71) Applicants: Tyco Electronics (Shanghai) Co. Ltd., Shanghai (CN); TE Connectivity Corporation, Berwyn, PA (US); Innogetic Technology Co., Ltd., Zhuhai (CN)

(72) Inventors: Liming Xin, Shanghai (CN); Lvhai Hu, Shanghai (CN); Yun Liu, Shanghai (CN); Dandan Zhang, Shanghai (CN); Roberto Francisco-Yi Lu, Berwyn, PA (US); Lei Zhou, Shanghai (CN); Kok Wai Wong, Zhuhai (CN)

(73) Assignees: Tyco Electronics (Shanghai) Co., Ltd., Shanghai (CN); TE Connectivity Corporation, Berwyn, PA (US); Innogetic Technology Co., Ltd., Zhuhai (CN)

( * ) Notice: Subject to any disclaimer, the term of this patent is extended or adjusted under 35 U.S.C. 154(b) by 0 days.

(21) Appl. No.: 15/975,274

(22) Filed: May 9, 2018

(65) Prior Publication Data
    US 2018/0257111 A1    Sep. 13, 2018

Related U.S. Application Data

(63) Continuation of application No. PCT/IB2016/055548, filed on Sep. 16, 2016.

(30) Foreign Application Priority Data

Sep. 16, 2015    (CN) .......................... 2015 1 0589615

(51) Int. Cl.
    *G02B 6/38*    (2006.01)
    *B08B 1/00*    (2006.01)
    (Continued)

(52) U.S. Cl.
    CPC .............. *B08B 1/006* (2013.01); *B08B 1/008* (2013.01); *B08B 3/04* (2013.01); *G02B 6/3866* (2013.01);
    (Continued)

(58) Field of Classification Search
    CPC ...... G02B 6/3866; G02B 6/3885; B08B 1/00; B08B 1/001; B08B 1/006; B08B 1/008; B08B 3/02; B08B 3/04
    (Continued)

(56) References Cited

U.S. PATENT DOCUMENTS 6,179,689 B1    1/2001   Ohno et al.
2015/0362680 A1 * 12/2015 Nakane ................ G02B 6/3866
                                                         15/105

FOREIGN PATENT DOCUMENTS

JP    2002350679       5/2001
JP    2003175448 A     6/2003
JP    2002066895       3/2005

OTHER PUBLICATIONS

PCT Notification of Transmittal of the International Search Report and the Written Opinion of the International Searching Authority, or the Declaration, International Search Report and Written Opinion of the International Searching Authority, dated Dec. 1, 2016, 12 pages.

(Continued)

*Primary Examiner* — Michael Mooney
(74) *Attorney, Agent, or Firm* — Barley Snyder

(57) ABSTRACT

A wiping system comprises a support table, a conveying unit configured to convey a wiping belt onto the support table, a carrier holding device configured to hold a carrier on which a plurality of fiber optic ferrules are mounted, a carrier pressing device configured to press the carrier on the support table with a plurality of front end faces of the fiber optic ferrules in direct contact with the wiping belt, and a first base (Continued)

on which the support table is mounted. The carrier holding device and the carrier pressing device are slidably mounted on the first base. The carrier pressed on the support table is movable back and forth relative to the support table in a first horizontal direction while the front end faces of the fiber optic ferrules remain in direct contact with the wiping belt.

20 Claims, 2 Drawing Sheets

(51) Int. Cl.
    *B08B 3/04*          (2006.01)
    *B08B 3/02*          (2006.01)

(52) U.S. Cl.
    CPC .............. *G02B 6/3885* (2013.01); *B08B 3/02* (2013.01); *G02B 6/3897* (2013.01)

(58) Field of Classification Search
    USPC ............... 385/53, 57, 61, 78, 85, 88–90, 93, 385/134–135, 137, 147; 15/97.1, 103.5, 15/210.1
    See application file for complete search history.

(56) References Cited

OTHER PUBLICATIONS

Abstract of JP2002066895, dated Mar. 2, 2005, 15 pages.
Abstract of JP2002350679, dated May 23, 2001, 10 pages.
Abstract of JP2003175448, dated Jun. 24, 2003, 7 pages.

\* cited by examiner

WIPING SYSTEM

CROSS-REFERENCE TO RELATED APPLICATIONS

This application is a continuation of PCT International Application No. PCT/IB2016/055548, filed on Sep. 16, 2016, which claims priority under 35 U.S.C. § 119 to Chinese Patent Application No. 201510589615.7, filed on Sep. 16, 2015.

FIELD OF THE INVENTION

The present invention relates to a wiping system and, more particularly, to a wiping system adapted to wipe a front end face of a fiber optic ferrule.

BACKGROUND

A fiber optic connector generally comprises a housing and a fiber optic ferrule mounted in the housing. The fiber optic ferrule has a ferrule and an optical fiber inserted into a bore of the ferrule. A front end of the optical fiber protrudes from a front end face of the ferrule by a predetermined distance. The optical fiber is fixed in the bore of the ferrule by an adhesive filled in the bore of the ferrule.

After the optical fiber is fixed in the bore of the ferrule, the front end face of the fiber optic ferrule is processed. The processing of the front end face of the fiber optic ferrule generally includes polishing the front end face of the fiber optic ferrule, cleaning the polished fiber optic ferrule to remove the polishing powder from the fiber optic ferrule, drying the cleaned fiber optic ferrule, and wiping the front end face of the dried fiber optic ferrule to remove dust from the front end face of the fiber optic ferrule. The processing of the fiber optic ferrule is generally performed manually and is therefore inefficient. Furthermore, the fiber optic ferrule is easily damaged during manual processing.

SUMMARY

A wiping system comprises a support table, a conveying unit configured to convey a wiping belt onto the support table, a carrier holding device configured to hold a carrier on which a plurality of fiber optic ferrules are mounted, a carrier pressing device configured to press the carrier on the support table with a plurality of front end faces of the fiber optic ferrules in direct contact with the wiping belt, and a first base on which the support table is mounted. The carrier holding device and the carrier pressing device are slidably mounted on the first base. The carrier pressed on the support table is movable back and forth relative to the support table in a first horizontal direction while the front end faces of the fiber optic ferrules remain in direct contact with the wiping belt.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
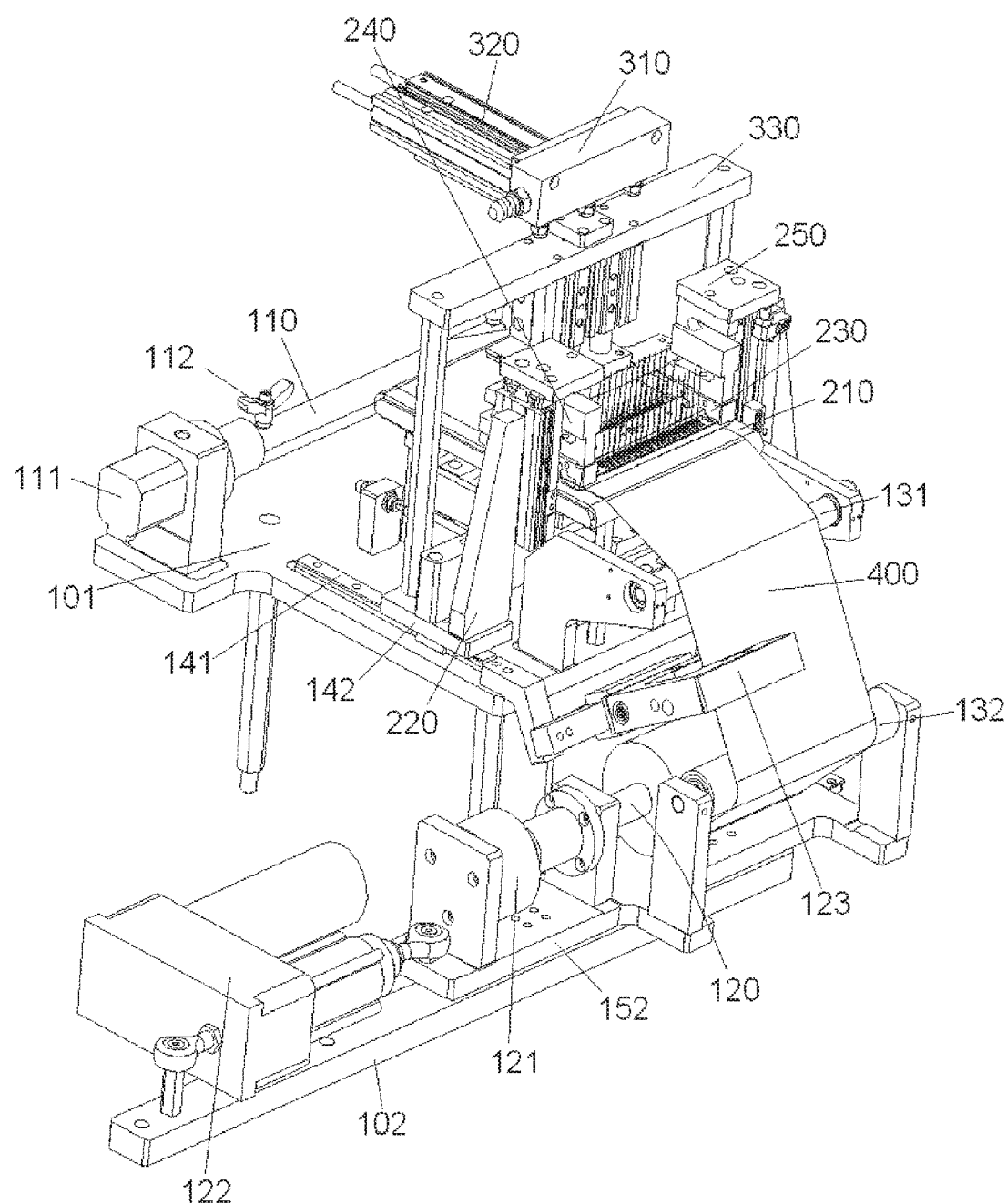
FIG. 1 is a perspective view of a wiping system according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
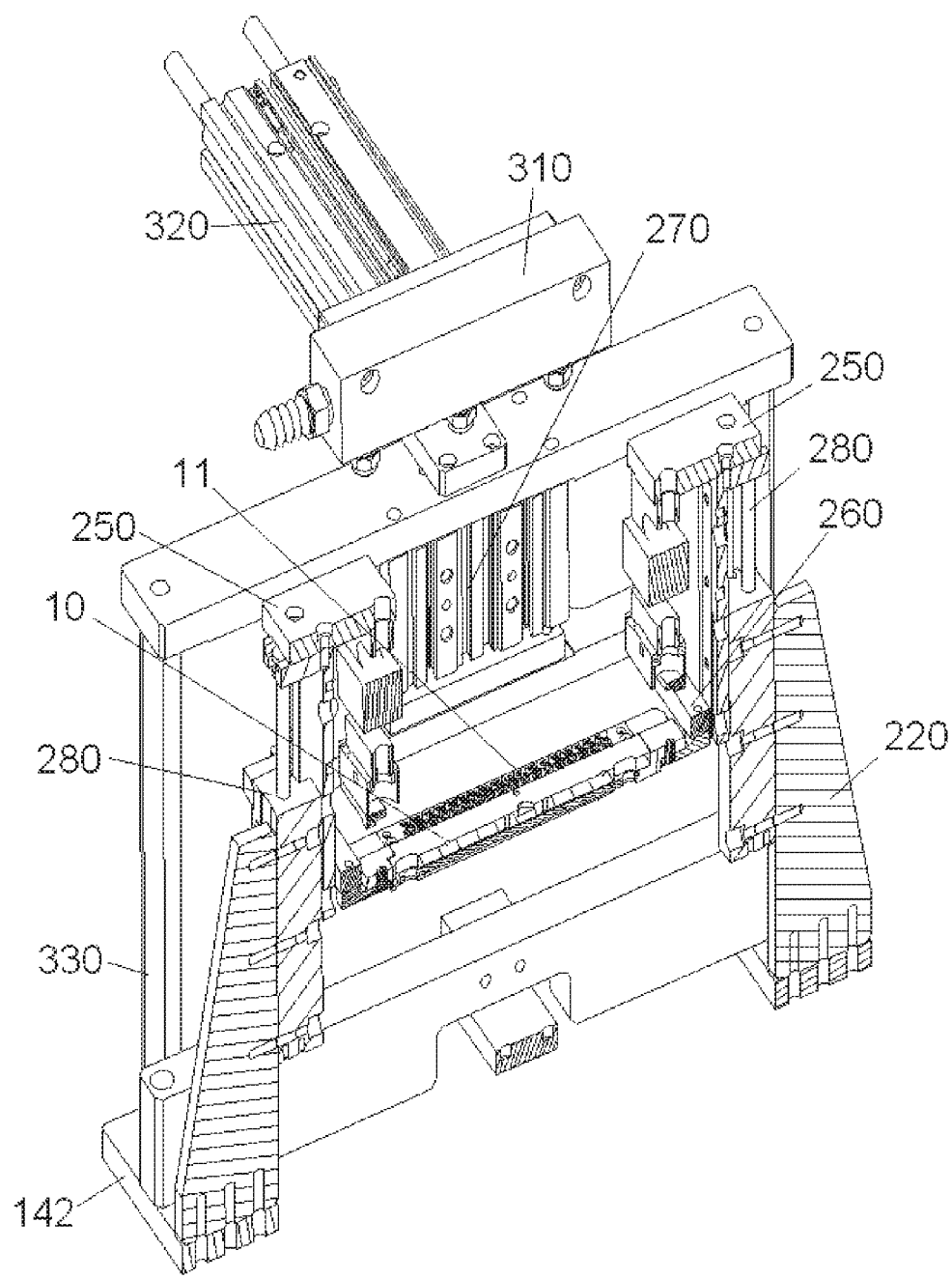
FIG. 2 is a sectional perspective view of a portion of the wiping system of FIG. 1.

A wiping system according to an embodiment is shown in FIGS. 1 and 2. The wiping system is adapted to wipe a front end face of a fiber optic ferrule 11, so as to clean off dust and contamination from the front end face of the fiber optic ferrule 11. The wiping system mainly comprises a support table 210, a conveying unit, a carrier holding device, a carrier pressing device, and a first base 101.

As shown in FIGS. 1 and 2, the conveying unit is configured to convey a wiping belt 400 onto the support table 210. The carrier holding device is configured to hold a carrier 10 on which a plurality of fiber optic ferrules 11 are mounted. The carrier pressing device is configured to press the carrier 10 on the support table 210, so that front end faces of the fiber optic ferrules 11 mounted on the carrier 10 directly contact the wiping belt 400 on the support table 210. The support table 210 is fixed on the first base 101.

The conveying unit, as shown in FIGS. 1 and 2, comprises a driven shaft 120 on which an unused portion, which has not wiped the fiber optic ferrules 11 of the wiping belt 400, is wound, a driving shaft 110 on which an used portion, which wiped the fiber optic ferrules 11 of the wiping belt 400, is wound, a plurality of tightening rollers 131, 132 adapted to tighten the wiping belt 400 and arranged between the driven shaft 120 and the driving shaft 110, and a driver 111 adapted to drive the driving shaft 110 to rotate. The plurality of tightening rollers 131, 132 include a first tightening roller 131 supported on the first base 101 and a second tightening roller 132 supported on a second base 102 of the wiping system. In other embodiments, the number of tightening rollers 131, 132 varies and may include three or more tightening rollers 131, 132.

The driver 111 is fixedly mounted on the first base 101, as shown in FIG. 1. When the driving shaft 110 is rotated by the driver 111, the unused wiping belt 400 is unspooled from the driven shaft 120 and is conveyed to the support table 210 to wipe the fiber optic ferrules 11, and the used wiping belt 400 is wound on the driving shaft 110. The support table 210 is positioned between the driving shaft 110 and the driven shaft 120. The driving shaft 110 includes an inner shaft connected to an output shaft of the driver 111 and an outer tube sleeved on the inner shaft. The inner shaft and the outer tube are detachably locked together by a locking member 112. The driven shaft 120 includes an inner shaft and an outer tube sleeved on the inner shaft. The inner shaft and the outer tube of the driven shaft 120 are detachably locked together by a locking member. By using the driving shaft 110 and the driven shaft 120 with locking members 112, it is easy to replace the wiping belt 400.

The conveying unit comprises a damper 121, shown in FIG. 1, coupled to the driven shaft 120 and adapted to exerted a damping moment to the driven shaft 120. The damper 121 prevents the driven shaft 120 from being rotated due to a pulling force produced during wiping the fiber optic ferrules 11 and ensures the wiping belt 400 on the support table 210 is kept in a static state during wiping the fiber optic ferrules 11. During wiping with the wiping belt 400, the driving shaft 110, the driven shaft 120, and the wiping belt 400 are kept in the static state, and only the carrier 10 and the fiber optic ferrules 11 thereon are moved. In an embodiment, the damping moment exerted by the damper 121 is adjustable according to an actual friction force produced during wiping the fiber optic ferrules 11.

The carrier holding device, as shown in FIG. 2, comprises a carrier holder 260 configured to hold the carrier 10 thereon and a lift mechanism 270 configured to move the carrier holder 260 up and down in a vertical direction.

The carrier pressing device, as shown in FIGS. 1 and 2, comprises a pressing head 230 adapted to be pressed on the carrier holder 260 and a force exerting mechanism 280 adapted to exert a predetermined pressing force on the pressing head 230. In an embodiment, the carrier pressing device comprises a pressure sensor 240 provided between the pressing head 230 and the force exerting mechanism 280 and adapted to detect a pressing force exerted by the force exerting mechanism 280. A pressing plate 250 is disposed on an end of the force exerting mechanism 280 and the pressure sensor 240 is provided between the pressing plate 250 and the pressing head 230. The pressing force exerted by the force exerting mechanism 280 is transferred onto the pressing head 230 through the pressing plate 250 and the pressure sensor 240.

The carrier holding device and the carrier pressing device are slidably mounted on the first base 101, so that the carrier 10 pressed on the support table 210 is movable back and forth relative to the support table 210 in a first horizontal direction. As shown in FIGS. 1 and 2, a first rail 141 extending in the first horizontal direction and a first sliding block 142 corresponding to and connected with the first rail 141 are provided on the first base 101. The carrier holding device and the carrier pressing device are mounted on the first sliding block 142, so as to slide along the first rail 141 together with the first sliding block 142. As shown in FIG. 2, the lift mechanism 270 and the force exerting mechanism 280 are mounted on the first sliding block 142.

In an embodiment, the wiping system further comprises a driving mechanism adapted to drive the first sliding block 142 to slide along the first rail 141. In various embodiment, the driving mechanism may be a gas cylinder, a hydraulic cylinder, or a linear actuator. When the carrier 10 is driven to move back and forth relative to the support table 210 in the first horizontal direction, the front end faces of the fiber optic ferrules 11 are wiped by the wiping belt 400 carried on the support table 210, cleaning off the dust and contamination from the front end faces of the fiber optic ferrules 11.

The driven shaft 120 and the damper 121 are slidably mounted on the second base 102 as shown in FIG. 1. A second rail extending in a second horizontal direction perpendicular to the first horizontal direction and a second sliding block 152 mated with the second rail are provided on the second base 102. The driven shaft 120 and the damper 121 are mounted on the second sliding block 152, so as to slide along the second rail together with the second sliding block 152.

The wiping system further comprises a deviation correcting device configured to prevent the conveyed wiping belt 400 from being deviated from a predetermined position in the second horizontal direction. The deviation correcting device, as shown in FIG. 1, comprises a position sensor 123 adapted to detect an actual position of the conveyed wiping belt 400 in the second horizontal direction and a position adjusting mechanism 122 configured to adjust the position of the driven shaft 120 based on an error between the actual position and the predetermined position of the wiping belt 400 until the error is equal to zero. The position adjusting mechanism 122 is mounted on the second base 102 and connected to the second sliding block 152, so as to drive the second sliding block 152 to slide along the second rail in the second horizontal direction. In this way, the position adjustment mechanism 122 is able to adjust the position of the wiping belt 400 in the second horizontal direction.

The wiping system, as shown in FIG. 1, comprises a support frame 220 mounted on the first sliding block 142. The force exerting mechanism 280 is connected to the support frame 220.

The wiping system comprises a cleaning liquid injection device configured to spray a cleaning liquid (for example, alcohol) onto the wiping belt 400 on the support table 210.

The cleaning liquid injection device comprises, as shown in FIGS. 1 and 2, a support bracket 330 mounted on the first sliding block 142, a cleaning liquid spray head 310 mounted on the support bracket 330, and a spray head driver 320 adapted to drive the cleaning liquid spray head 310 to spray the cleaning liquid on the wiping belt 400.

What is claimed is:

1. A wiping system, comprising:
   a support table;
   a conveying unit configured to convey a wiping belt onto the support table;
   a carrier holding device configured to hold a carrier on which a plurality of fiber optic ferrules are mounted;
   a carrier pressing device configured to press the carrier on the support table with a plurality of front end faces of the fiber optic ferrules in direct contact with the wiping belt; and
   a first base on which the support table is mounted, the carrier holding device and the carrier pressing device are slidably mounted on the first base and the carrier pressed on the support table is movable back and forth relative to the support table in a first horizontal direction while the front end faces of the fiber optic ferrules remain in direct contact with the wiping belt.

2. The wiping system of claim 1, wherein the first base has a first rail extending in a first horizontal direction and a first sliding block connected with the first rail, the carrier holding device and the carrier pressing device are mounted on the first sliding block and slide along the first rail with the first sliding block.

3. The wiping system of claim 2, wherein the conveying unit comprises:
   a driven shaft on which an unused portion of the wiping belt is wound;
   a driving shaft on which a used portion of the wiping belt is wound, the support table positioned between the driving shaft and the driven shaft;
   a plurality of tightening rollers adapted to tighten the wiping belt between the driven shaft and the driving shaft; and
   a driver adapted to drive the driving shaft to rotate, and when the driving shaft is rotated by the driver, the unused portion of the wiping belt is unspooled from the driven shaft, the wiping belt is conveyed onto the support table and into contact with the front end faces of the fiber optic ferrules, and the used portion of the wiping belt is wound on the driving shaft.

4. The wiping system of claim 3, wherein the conveying unit comprises a damper connected to the driven shaft and adapted to exerted a damping moment to the driven shaft.

5. The wiping system of claim 4, further comprising a second base, the driver is mounted on the first base and the driven shaft and the damper are slidably mounted on the second base.

6. The wiping system of claim 5, wherein the second base has a second rail extending in a second horizontal direction perpendicular to the first horizontal direction and a second sliding block mated with the second rail, the driven shaft and the damper are mounted on the second sliding block and slide along the second rail together with the second sliding block.

7. The wiping system of claim 6, further comprising a deviation correcting device configured to prevent the wiping belt from deviating from a predetermined position in the second horizontal direction.

8. The wiping system of claim 7, wherein the deviation correcting device comprises:
a position sensor adapted to detect an actual position of the wiping belt in the second horizontal direction; and
a position adjusting mechanism configured to adjust the position of the driven shaft based on an error between the actual position and the predetermined position of the wiping belt until the error is equal to zero.

9. The wiping system of claim 8, wherein the position adjusting mechanism is mounted on the second base and is connected to the second sliding block, the position adjusting mechanism driving the second sliding block to slide along the second rail.

10. The wiping system of claim 9, wherein the plurality of tightening rollers include a first tightening roller supported on the first base and a second tightening roller supported on the second base.

11. The wiping system of claim 10, wherein the driving shaft includes an inner shaft connected to an output shaft of the driver and an outer tube sleeved on the inner shaft, the inner shaft and the outer tube are detachably locked together by a locking member.

12. The wiping system of claim 2, further comprising a driving mechanism configured to drive the first sliding block to slide along the first rail.

13. The wiping system of claim 2, wherein the carrier holding device comprises:
a carrier holder configured to hold the carrier thereon; and
a lift mechanism configured to move the carrier holder up and down in a vertical direction.

14. The wiping system of claim 13, wherein the carrier pressing device comprises:
a pressing head adapted to be pressed on the carrier holder; and
a force exerting mechanism adapted to exert a predetermined pressing force on the pressing head.

15. The wiping system of claim 14, wherein the carrier pressing device comprises a pressure sensor disposed between the pressing head and the force exerting mechanism and adapted to detect a pressing force exerted by the force exerting mechanism.

16. The wiping system of claim 15, wherein a pressing plate is disposed on an end of the force exerting mechanism and the pressure sensor is disposed between the pressing plate and the pressing head, the pressing force exerted by the force exerting mechanism is transferred onto the pressing head through the pressing plate and the pressure sensor.

17. The wiping system of claim 16, wherein the lift mechanism and the force exerting mechanism are mounted on the first sliding block.

18. The wiping system of claim 17, further comprising a support frame mounted on the first sliding block, the force exerting mechanism connected to the support frame.

19. The wiping system of claim 2, further comprising a cleaning liquid injection device configured to spray a cleaning liquid onto the wiping belt.

20. The wiping system of claim 19, wherein the cleaning liquid injection device comprises:
a support bracket mounted on the first sliding block;
a cleaning liquid spray head mounted on the support bracket; and
a spray head driver adapted to drive the cleaning liquid spray head to spray the cleaning liquid on the wiping belt.

* * * * *